J. JOHNSON, S. J. SMITH & S. INGERSOLL.
CLOTHES LINE FASTENER.
No. 88,175. Patented Mar. 23, 1869.
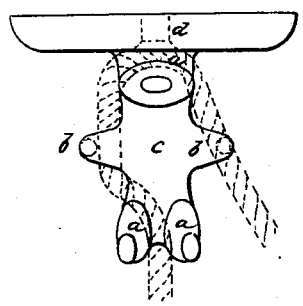
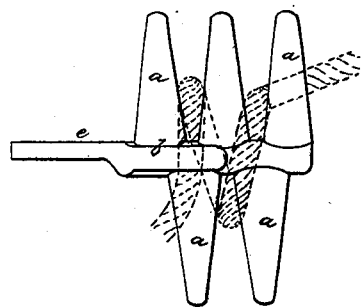
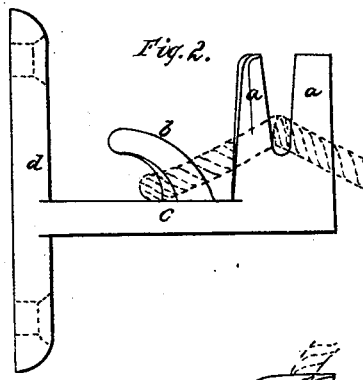
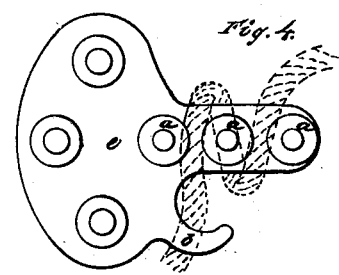
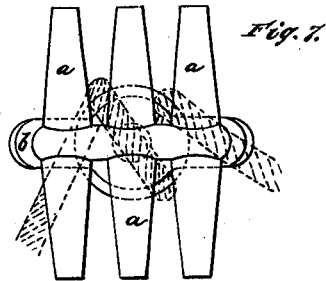
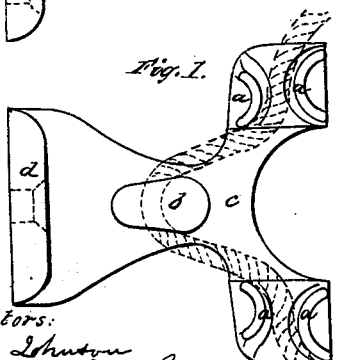
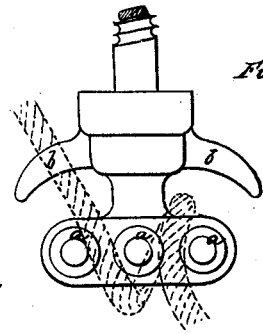

JOB JOHNSON, SAMUEL J. SMITH, AND SIMON INGERSOLL, OF BROOKLYN, NEW YORK, ASSIGNORS TO JOB JOHNSON AND SAMUEL J. SMITH.

Letters Patent No. 88,175, dated March 23, 1869.

IMPROVED CLOTHES-LINE FASTENER.

The Schedule referred to in these Letters Patent and making part of the same.

*To all whom it may concern:*

Be it known that we, JOB JOHNSON, SAMUEL J. SMITH, and SIMON INGERSOLL, of Brooklyn, in the county of Kings, and State of New York, have invented and made a certain new and useful Improvement in Fastenings for Clothes-Lines, &c.; and we do hereby declare the following to be a full, clear, and exact description of the said invention, reference being had to the annexed drawing, making part of this specification, wherein—

Figure 1 is a plan, and

Figure 2 is an elevation of our said fastener, in a form adapted to being screwed, or nailed to the side of a wall, fence, or post.

Figure 3 is a plan of a similar fastening, with the attaching-plate contiguous to one of the tapering jaws.

Figure 4 is a plan, and

Figure 5 is a side elevation of our said fastening, in a form adapted to being held by a plate screwed upon a horizontal surface, such as the top of a fence or rail.

Figure 6 is a plan, and

Figure 7 is a front view of a similar fastening, adapted to being secured by a horizontal-projecting screw, to penetrate the fence, post, or other wood-work.

Similar marks of reference denote the same parts.

The object of this invention is to secure a clothes-line, or other rope, or cord, by means of a tapering stationary jaw, so that the line, passing once or twice through jaws of this character, will be firmly retained, and not require tying; and in combination with such tapering jaws, we employ a finger, beneath which the line passing, causes the strain on the line to draw the same down into the narrower portion of the tapering jaw.

In the drawing, *a a* represent the side-pieces, that are rounded upon their edges and tapering, so that the opening, or jaw formed between them is wider at the open end, and sufficiently narrow at bottom of the jaw to prevent any cord, rope, or line to which it is adapted, passing down to the very bottom of the jaw;- hence said line will always be received between the tapering sides of the jaw, and the pull upon such line will tend to draw the same tightly between such jaws, and cause them to hold the line firmly by a wedging-clamping action.

The red lines illustrate the way in which the line, or rope may be wound around between the jaws, to insure a proper and firm hold upon the same.

In order to hold down the rope, either as it passes up into the jaws, or between the jaws, we employ a finger, *b.*

In figs. 1 and 2, this finger is between the jaws *a a*, on the arm *c*, and, in fig. 3, two such fingers are shown as standing downward, to hitch the line under.

In figs. 4 and 5, one such finger, *b*, and in figs. 6 and 7, two of them are shown, as applied like horns, horizontally, to keep the rope from rising up, (by its stiffness,) and working out of the jaws *a a.*

In figs. 1, 2, and 3, *d* is a vertical plate, with holes for screws or nails to attach the fastening.

In figs. 4 and 5, *e* is a plate, fitted to stand horizontally, and be similarly attached, and in figs. 6 and 7, this fastening is shown as provided with a screw, to enter the post, or wood-work to which the fastening is to be applied.

These fastenings are to be made of metal, and of a size adapted to the rope, cord, or line employed.

We are aware that ropes have been clamped between jaws, one side of which has been made to swing, and the holding of the rope has thereby been effected by pressure, instead of a wedging-action, as in the present invention.

What we claim, and desire to secure by Letters Patent, is—

1. The fastening for lines and ropes, formed of tapering, rounded, stationary side-pieces, between which are open, tapering jaws, for wedging and clamping the line, or rope, as specified.

2. The finger *b*, in combination with the stationary, tapering jaws, to cause the line to wedge down into such jaws, by the pull on the same, substantially as set forth.

In witness whereof, we have hereunto set our signatures, this 30th day of January, 1869.

JOB JOHNSON.
S. J. SMITH.
SIMON INGERSOLL.

Witnesses:
CHAS. H. SMITH,
GEO. T. PINCKNEY.